(12) United States Patent
Lu et al.

(10) Patent No.: US 12,457,159 B2
(45) Date of Patent: Oct. 28, 2025

(54) DELAY PERFORMANCE EVALUATION METHOD AND APPARATUS, AND STORAGE MEDIUM

(71) Applicant: ZTE CORPORATION, Shenzhen (CN)

(72) Inventors: Liuming Lu, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 593 days.

(21) Appl. No.: 17/911,339

(22) PCT Filed: Dec. 30, 2020

(86) PCT No.: PCT/CN2020/141468
§ 371 (c)(1),
(2) Date: Sep. 13, 2022

(87) PCT Pub. No.: WO2021/184919
PCT Pub. Date: Sep. 23, 2021

(65) Prior Publication Data
US 2023/0134239 A1 May 4, 2023

(30) Foreign Application Priority Data
Mar. 15, 2020 (CN) .......................... 202010178787.6

(51) Int. Cl.
*H04L 41/14* (2022.01)
*H04L 43/0852* (2022.01)
*H04L 43/106* (2022.01)

(52) U.S. Cl.
CPC .......... *H04L 43/0852* (2013.01); *H04L 41/14* (2013.01); *H04L 43/106* (2013.01)

(58) Field of Classification Search
None
See application file for complete search history.

(56) References Cited

U.S. PATENT DOCUMENTS

2008/0176519 A1 7/2008 Kwak et al.
2015/0110091 A1 4/2015 Ryu et al.
(Continued)

FOREIGN PATENT DOCUMENTS

CN 101039455 A 9/2007
CN 101175313 A 5/2008
(Continued)

OTHER PUBLICATIONS

Extended European Search Report of Application No. 20926057.9, dated Mar. 15, 2024, 12 pages.
(Continued)

*Primary Examiner* — Angela Nguyen
(74) *Attorney, Agent, or Firm* — Morgan, Lewis & Bockius LLP

(57) ABSTRACT

Provided are a delay performance evaluation method and apparatus and a storage medium. The delay performance evaluation method includes sending, by a first communication node, an evaluation data unit to a second communication node; receiving, by the first communication node, an evaluation feedback data unit which is sent by the second communication node and sent according to the evaluation data unit; and according to a transmission condition of the evaluation data unit and the evaluation feedback data unit, acquiring, by the first communication node, a delay evaluation parameter caused by internal communication contention or control of a BSS where the first communication node is located and/or a delay evaluation parameter caused by an external interference of the BSS.

18 Claims, 8 Drawing Sheets

(56) References Cited

U.S. PATENT DOCUMENTS

| | | | |
|---|---|---|---|
| 2017/0041957 A1 | 2/2017 | Pazhyannur et al. | |
| 2017/0272317 A1* | 9/2017 | Singla | H04W 12/062 |
| 2017/0272977 A1 | 9/2017 | Rengarajan et al. | |
| 2019/0132762 A1 | 5/2019 | Zhu et al. | |
| 2023/0034981 A1* | 2/2023 | Kishida | H04L 1/205 |

FOREIGN PATENT DOCUMENTS

| | | |
|---|---|---|
| CN | 101390412 B | 7/2013 |
| CN | 104272807 A | 1/2015 |
| CN | 105025552 A | 11/2015 |
| CN | 105682239 A | 6/2016 |
| CN | 105917704 A | 8/2016 |
| CN | 105939543 A | 9/2016 |
| CN | 107113755 A | 8/2017 |
| CN | 110519787 A | 11/2019 |
| WO | WO2017118297 A1 | 12/2016 |

OTHER PUBLICATIONS

Chinese Search Report for Application No. 2020101787876, Mar. 7, 2024, 8 pages including translation.

Chinese Office Action for Application No. 2020101787876, Mar. 8, 2024, 8 pages including translation.

Prashanth AK Acharya et al: "Rate Adaptation in Congested Wireless Networks through Real-Time Measurements", IEEE Transactions on Mobile Computing, IEEE Service Center, Los Alamitos, CA, US, vol. 9, No. 11, Nov. 1, 2010 (Nov. 1, 2010), pp. 1535-1550.

Mohamed Abouelseoud (Sony): "Reducing Channel Access Delay for RTA Traffic", IEEE Draft; 11-19-1960-01-00BE-Reducing-Channel-Access-Delay-for-RTA-Traffic, IEEE-SA Mentor, Piscataway, NJ USA, vol. 802.11 EHT; 802.11be, No. 1, Nov. 13, 2019 (Nov. 13, 2019), pp. 1-10.

Liuming Lu (ZTE Corporation): "Latency Measurement for Low Latency Applications", IEEE Draft; 11-20-0484-00-00BE-Latency-Measurement-for-Low-Latency-Applications, IEEE-SA Mentor, Piscataway, NJ USA, vol. 802.11 EHT; 802.11be, Mar. 15, 2020 (Mar. 15, 2020), pp. 1-13.

Ericsson LM, "EC-GSM Exception Report Latency Performance Evaluation (Update of GPC150211)", 3GPP TSG GERAN #66, Tdoc GP-150449, Vilnius, Lithuania, May 25, 2015, 8 pages.

Nokia, "Throughput and Latency Performance Analysis for UL MCL Improvement", 3GPP TSG RAN WG6 #3, R6-170075, Athens, Greece, Feb. 13, 2017, 4 pages.

Ericsson LM, "EC-GSM Exception Report Latency Performance Evaluation", 3GPP TSG GERAN #65, Tdoc GP-150269, Shanghai, China, Mar. 9, 2015, 8 pages.

International Search Report in Application No. PCT/CN2020/141468, dated Mar. 19, 2021, 6 pages, including English Translation.

\* cited by examiner

DELAY PERFORMANCE EVALUATION METHOD AND APPARATUS, AND STORAGE MEDIUM

CROSS REFERENCE TO RELATED APPLICATIONS

This application is a national stage application filed under 35 U.S.C. 371 based on International Patent Application No. PCT/CN2020/141468, filed on Dec. 30, 2020, which claims priority to Chinese Patent Application No. 202010178787.6 filed with the China National Intellectual Property Administration (CNIPA) on Mar. 15, 2020, the disclosure of which is incorporated herein by reference in its entirety.

This application claims priority to Chinese Patent Application No. 202010178787.6 filed with the China National Intellectual Property Administration (CNIPA) on Mar. 15, 2020, the disclosure of which is incorporated herein by reference in its entirety.

TECHNICAL FIELD

The present application relates to the field of wireless communication networks, for example, a delay performance evaluation method and apparatus and a storage medium.

BACKGROUND

In a field of wireless networks, the wireless local area network (WLAN) develops rapidly. Wireless Fidelity (WIFI) is an important part of the WLAN. WIFI uses unlicensed spectra for data communication, so great uncertainty exists in the communication environment and interference intensity. In WIFI, an access point (AP) and multiple stations (STAs) with which the AP associates form a basic service set (BSS). WIFI mainly adopts a distributed coordination function (DCF) and an enhanced distributed channel access (EDCA) mode. A core of the DCF and the EDCA mode is a carrier sense multiple access with collision avoidance (CSMA/CA) mechanism. Although the CSMA/CA can satisfy multi-station fair access and maintain a relatively large throughput, but cannot strictly guarantee to satisfy transmission requirements of low-delay services, especially when a large number of users access. Although a point coordination function (PCF) and hybrid coordination function (HCF) controlled channel access (HCCA) has introduced a non-contention channel access method to achieve a certain degree of controlled data transmission and scheduling, once data transmission is interfered in an operating frequency band, the reliability and robustness are greatly reduced.

To support low-delay service operation modes such as virtual reality and online games in WIFI, a delay performance in the WIFI communication environment needs to be evaluated, so as to provide an evaluation basis for adjustment and optimization of WIFI access strategies and methods.

The related art cannot yet achieve the evaluation of the delay performance of WIFI.

SUMMARY

The present application provides a delay performance evaluation method and apparatus and a storage medium so as to solve the technical problem that a delay performance cannot be evaluated.

An embodiment of the present application provides a delay performance evaluation method. The delay performance evaluation method includes the following processes. The first communication node sends an evaluation data unit to a second communication node and receives an evaluation feedback data unit which is sent by the second communication node and sent according to the evaluation data unit; and according to the evaluation feedback data unit and a transmission condition of the evaluation data unit, the first communication node acquires a delay evaluation parameter caused by internal communication contention or control of a basic service set (BSS) where the first communication node is located and/or a delay evaluation parameter caused by an external interference of the BSS.

An embodiment of the present application provides a delay performance evaluation apparatus. The delay performance evaluation apparatus includes a processor. The processor is configured to perform the delay performance evaluation method according to any of the preceding embodiments when executing computer programs.

An embodiment of the present application provides a storage medium. The storage medium is configured to store computer programs which, when executed by a processor, perform any delay performance evaluation method in embodiments of the present application.

The preceding embodiments and other non-reserved aspects of the present application and implementations thereof are described in more detail in the brief description of drawings, embodiments, and claims.

DETAILED DESCRIPTION

Embodiments of the present application are described hereinafter in conjunction with drawings.

In view of a problem that WIFI access technology is difficult to ensure a low delay, in the present application, a first communication node sends an evaluation data unit to a second communication node, the first communication node receives an evaluation feedback data unit which is sent by the second communication node and sent according to the evaluation data unit, according to the evaluation feedback data unit and a transmission condition of the evaluation data unit, the first communication node acquires a delay evaluation parameter caused by internal communication contention or control of a BSS where the first communication node is located and/or a delay evaluation parameter caused by an external interference of the BSS, so as to provide an evaluation basis for adjustment and optimization of service access strategies and methods, thereby achieving access to low-delay services.

Figure 1:
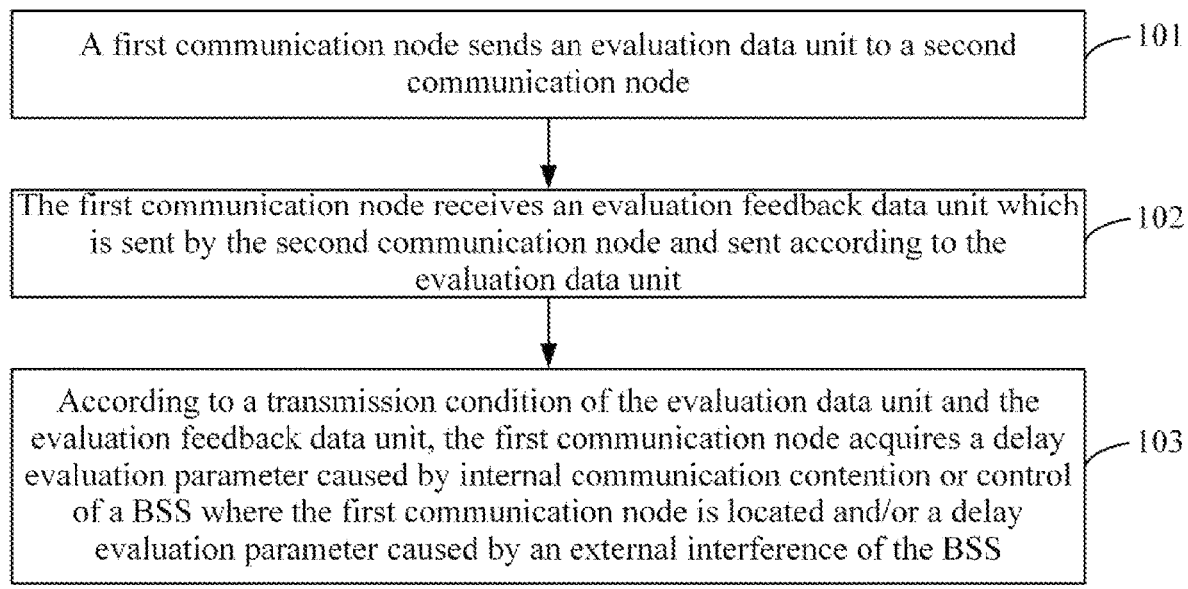
FIG. 1 is a flowchart of a delay performance evaluation method according to an embodiment.

FIG. 1 is a flowchart of a delay performance evaluation method according to an embodiment. This embodiment is applicable to a scenario of evaluating a delay performance. This embodiment may be implemented by a delay performance evaluation apparatus, which may be implemented in software and/or hardware and may be integrated into an access point or a station. As shown in FIG. 1, the delay performance evaluation method according to this embodiment includes 101-103.

In 101, a first communication node sends an evaluation data unit to a second communication node.

In 102, the first communication node receives an evaluation feedback data unit which is sent by the second communication node and sent according to the evaluation data unit.

In 103, according to the evaluation feedback data unit and a transmission condition of the evaluation data unit, the first communication node acquires a delay evaluation parameter caused by internal communication contention or control of a BSS where the first communication node is located and/or a delay evaluation parameter caused by an external interference of the BSS.

In an embodiment, the first communication node and the second communication node may be an access point (AP) or a non-AP (non-AP STA), that is, a station. The access point or the station corresponds to the BSS. Optionally, the BSS in this embodiment may be a BSS in WIFI.

Exemplarily, in the case where the first communication node is an AP, the second communication node may be a STA; and in the case where the first communication node is a STA, the second communication node may be an AP.

Figure 2:
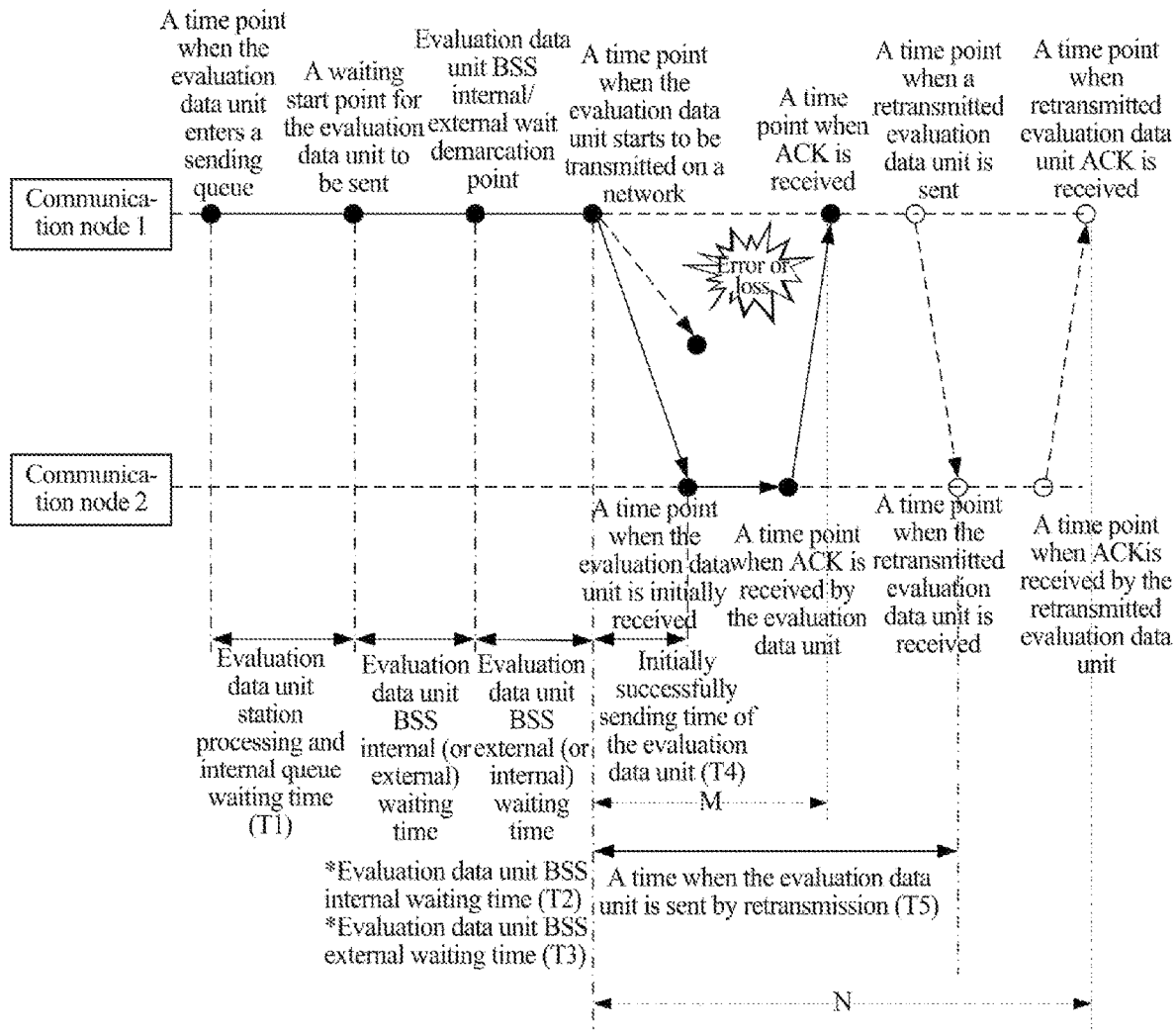
FIG. 2 is a schematic diagram of delay evaluation parameters according to an embodiment.

FIG. 2 is a schematic diagram of delay evaluation parameters according to an embodiment. The distribution of evaluation data unit transmission time points between two communication nodes is shown in FIG. 2.

Evaluation data unit station processing and internal queue waiting time (a first evaluation parameter, denoted by T1) is a time period between a time point when the evaluation data unit enters a sending queue and a waiting start point for the evaluation data unit to be sent and the first evaluation parameter is mainly caused by a communication environment of the station within the BSS, which includes a processing time of the evaluation data unit, and/or a queuing time of the evaluation data unit from entering the queue to being dequeued, and/or a time for competing and waiting between internal queues. The first evaluation parameter may be represented by a difference between a timestamp of the waiting start point for the evaluation data unit to be sent and a timestamp of a time point when a packet enters a sending queue.

BSS internal waiting time of the evaluation data unit (a second evaluation parameter, denoted by T2) refers to a waiting time period during which other stations in the BSS transmit data, and the waiting time period is within a time period between a time point when the evaluation data unit starts to be transmitted on a network and a waiting start point for the packet to be sent, that is, a time that the evaluation data unit waits to acquire a transmission opportunity (TXOP) through BSS internal contention or coordination, where the time is caused by an internal communication environment of the BSS. The second evaluation parameter may be represented by a timestamp of a starting time point of evaluation data unit BSS internal waiting and a timestamp of an end time point of the evaluation data unit BSS internal waiting.

BSS external waiting time of the evaluation data unit (a third evaluation parameter, denoted by T3) refers to a waiting time period during which a communication node in an overlapping basic service set (OBSS) outside the BSS transmits data, where the waiting time period is within a time period between the time point when the evaluation data unit starts to be transmitted on the network and the waiting start point for the evaluation data unit to be sent, that is, a time for the evaluation data unit to wait for the OBSS station to release spectrum resources, where the time is caused by an transmission interference of the OBSS outside the BSS. The third evaluation parameter may be represented by a timestamp of a starting time point of evaluation data unit BSS external waiting and a timestamp of an end time point of the evaluation data unit BSS external waiting.

An initially successfully sending time of the evaluation data unit (a fourth evaluation parameter, denoted by T4) is a time period between a time point when the evaluation data unit is initially received and the time point when the evaluation data unit starts to be transmitted on the network, that is, a time period when the evaluation data unit is successfully sent for the first time, where the time is a transmission time of the evaluation data unit on the network. The fourth evaluation parameter may be represented by a timestamp of the time point when the evaluation data unit is initially received and a timestamp of the time point when the evaluation data unit starts to be transmitted on the network.

A time when the evaluation data unit is sent by retransmission (a fifth evaluation parameter, denoted by T5) is a time period between a time point when a retransmitted evaluation data unit is received and the time point when the evaluation data unit starts to be transmitted on the network and is caused by an error or loss of an initially sent evaluation data unit, where the time is mainly caused by an external interference environment of the BSS. The fifth evaluation parameter may be represented by a timestamp of the time point when the retransmitted evaluation data unit is received and the timestamp of the time point when the evaluation data unit starts to be transmitted on the network.

Based on an analysis of factors for generating the preceding delays, the delay evaluation parameters are divided into two parts: $T_{in}$ and $T_{out}$.

$T_{in}$ denotes a delay evaluation parameter caused by BSS internal communication contention or control in a process of transmitting the evaluation data unit and is referred to as a BSS internal delay or a test internal delay.

$T_{out}$ denotes a delay evaluation parameter caused by a BSS external interference in the process of transmitting the evaluation data unit and is referred to as a BSS external delay or a test external delay.

The delay evaluation parameter caused by the internal communication contention or control of the BSS includes at least one of the first evaluation parameter, the second evaluation parameter, or the fourth evaluation parameter.

The delay evaluation parameter caused by the external interference of the BSS includes the third evaluation parameter and/or the fifth evaluation parameter.

The composition of the test internal delay and the test external delay in different scenarios is described below.

In a first scenario, a time of transmitting the evaluation data unit on the network is considered.

In the case where the evaluation data unit station processing and internal queue waiting time is considered, $T_{in}=T1+T2+T4$; and in the case where the evaluation data unit station processing and internal queue waiting time is not considered, $T_{in}=T2+T4$; where $T4=0$ in the case where initial transmission of the evaluation data unit fails.

$T_{out}=T3+T5$, where $T5=0$ in the case where the initial transmission of the evaluation data unit is successful, and T5 is a relatively large preset value in the case where the evaluation data unit is lost.

In a second scenario, a time of transmitting the evaluation data unit on the network is not considered.

In the case where the evaluation data unit station processing and internal queue waiting time is considered, $T_{in}=T1+T2$; and in the case where the evaluation data unit station processing and internal queue waiting time is not considered, $T_{in}=T2$.

$T_{out}=T3$.

The following describes how to acquire T1, T2, T3, T4, and T5.

The first communication node may acquire, through information such as a timer and/or duration of the received evaluation data unit, relevant transmission delay parameters generated by the first communication node sending the evaluation data unit. For the transmission delay parameters of the evaluation data unit, the communication node starts timing from the time point when the evaluation data unit enters the sending queue, until ACKnowledgement (ACK) information is received from a receiving terminal of the evaluation data unit or it is determined that the evaluation data unit is lost, during which the time point when the evaluation data unit enters the sending queue, the waiting start point for the evaluation data unit to be sent, a starting point when the evaluation data unit starts to be transmitted on the network, and a time point when the ACK information is received from the receiving terminal of the evaluation data unit or a time point when the ACK information is received from the receiving terminal after the evaluation data unit is retransmitted.

The evaluation data unit station processing and internal queue waiting time, that is, T1, is a time difference between the waiting start point for the evaluation data unit to be sent and the time point when the evaluation data unit enters the sending queue.

In an embodiment, the initially successfully sending time of the evaluation data unit, that is, T4, may be obtained by a time difference between the time point when the evaluation data unit is initially received and the time point when the evaluation data unit starts to be transmitted on the network. In another embodiment, in the case where a receiver of the evaluation data unit has feedback of an acknowledgement receipt message, T4 may be measured as a time difference between the time point when the ACK is received from the receiving terminal of the evaluation data unit and the starting point when the evaluation data unit starts to be transmitted on the network, that is, a time period represented by a line segment M in FIG. 2. That is, T4 may be determined by a time point when a sender of the evaluation data unit receives the acknowledgement receipt message of the evaluation data unit and the time point when the evaluation data unit starts to be transmitted on the network.

In an embodiment, the time when the evaluation data unit is sent by retransmission, that is, T5, may be obtained by a time difference between the time point when the retransmitted evaluation data unit is received and the time point when the evaluation data unit starts to be transmitted on the network. In another embodiment, in the case where a receiver of the retransmitted evaluation data unit has feedback of an acknowledgement receipt message, T5 may be measured as a time difference between the time point when retransmitted evaluation data unit ACK is received from the receiving terminal after retransmission of the evaluation data unit and the starting point when the evaluation data unit starts to be transmitted on the network, that is, a time period represented by a line segment N in FIG. 2. That is, T5 may be determined by a time point when the sender of the evaluation data unit receives the acknowledgement receipt message after the retransmission of the evaluation data unit and the time point when the evaluation data unit starts to be transmitted on the network.

The BSS internal waiting time of the evaluation data unit, that is, T2, and the BSS external waiting time of the evaluation data unit, that is, T3, are acquired through the methods described below. Through a time for receiving an internal BSS packet and an OBSS packet between the starting point when the evaluation data unit starts to be transmitted on the network and the waiting start point for the evaluation data unit to be sent and duration information carried by the internal BSS packet and the OBSS packet, the first communication node acquires T2 and T3.

$$T2=T(\text{Intra-BSS-Duration.1})+T(\text{Intra-BSS-Duration.2})+\ldots+T(\text{Intra-BSS-Duration}.M).$$

$$T3=T(\text{OBSS-Duration.1})+T(\text{OBSS-Duration.2})+\ldots+T(\text{OBSS-Duration}.N).$$

T(Intra-BSS-Duration.1), T(Intra-BSS-Duration.2), ..., and T(Intra-BSS-Duration.M) refer to time lengths corresponding to durations of a packet 1, a packet 2, ..., and a packet M in the BSS received between the time point when the evaluation data unit starts to be transmitted on the network and the waiting start point for the evaluation data unit to be sent.

T(OBSS-Duration.1), T(OBSS-Duration.2), ..., and T(OBSS-Duration.N) refer to time lengths corresponding to durations of the packet 1, the packet 2, ..., and a packet N of the OBSS received between the time point when the evaluation data unit starts to be transmitted on the network and the waiting start point for the evaluation data unit to be sent.

The first communication node determines a sum of time lengths corresponding to transmission durations of received internal packets of the BSS in the time period between the time point when the evaluation data unit starts to be transmitted on the network and the waiting start point for the evaluation data unit to be sent to be a time period of waiting for other communication nodes other than the communication node in the BSS where the first communication node is located to transmit data in the time period between the time point when the evaluation data unit starts to be transmitted on the network and the waiting start point for the evaluation data unit to be sent.

The first communication node determines a sum of time lengths corresponding to transmission durations of received packets of the OBSS in the time period between the time point when the evaluation data unit starts to be transmitted on the network and the waiting start point for the evaluation data unit to be sent to be a time period of waiting due to transmission of a communication node in the OBSS outside the BSS in the time period between the time point when the evaluation data unit starts to be transmitted on the network and the waiting start point for the evaluation data unit to be sent.

In an embodiment, the evaluation data unit includes at least one of the following: the first evaluation parameter, the second evaluation parameter, the third evaluation parameter, timestamps before and when the evaluation data unit is sent, or an identifier of the evaluation data unit.

The timestamps before and when the evaluation data unit is sent include a timestamp of the waiting start point for the evaluation data unit to be sent, a timestamp of the time point when the evaluation data unit enters the sending queue, a timestamp of a starting time point of evaluation data unit BSS internal waiting, a timestamp of an end time point of the evaluation data unit BSS internal waiting, a timestamp of a starting time point of evaluation data unit BSS external waiting, a timestamp of an end time point of the evaluation data unit BSS external waiting, and a timestamp of the time point when the evaluation data unit starts to be transmitted on the network.

In a first implementation manner, the evaluation data unit may only include the identifier of the evaluation data unit.

In a second implementation manner, the evaluation data unit may include at least one of the first evaluation parameter, the second evaluation parameter, or the third evaluation parameter and the identifier of the evaluation data unit.

In a third implementation manner, the evaluation data unit may include the timestamps before and when the evaluation data unit is sent and the identifier of the evaluation data unit.

Based on content included in the evaluation data unit, the evaluation data unit may also have other implementation manners, which are not listed one by one here.

In an embodiment, encapsulation of the evaluation data unit may be implemented in two manners. One is an independent evaluation data unit. The independent evaluation data unit refers to a data unit specially used for performing delay performance evaluation and is not loaded with other service data and management and control information. Another manner of encapsulating the evaluation data unit is a dependent evaluation data unit. The dependent evaluation data unit refers to a data unit with evaluation data and an evaluation identifier and an evaluation parameter field are added to the dependent evaluation data unit based on an existing service data unit or management and control unit.

A frame header of a first data frame where the independent evaluation data unit is located indicates that a type of the first data frame is an evaluation data unit type, and/or the frame header of the first data frame carries the identifier of the evaluation data unit. That is, the frame header of the first data frame indicates that the type of the first data frame is the evaluation data unit type, and/or the frame header of the first data frame carries the identifier of the evaluation data unit. In this embodiment, the independent evaluation data unit does not carry the evaluation parameter and the timestamps.

A frame body of the first data frame includes at least one of the following: the first evaluation parameter, the second evaluation parameter, the third evaluation parameter, or timestamps before and when the evaluation data unit is sent.

Figure 3A:
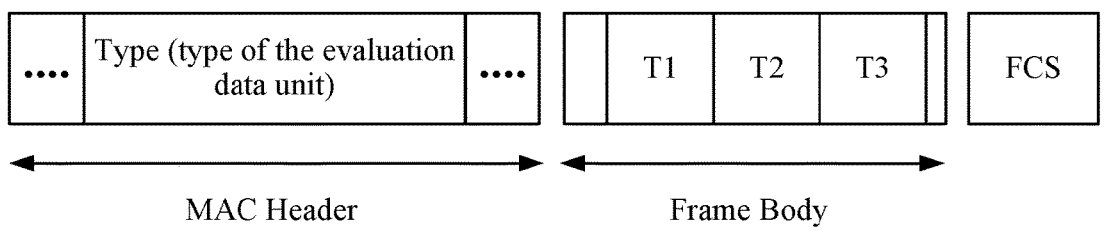
FIG. 3A is a schematic diagram of an embodiment of an evaluation data unit.

FIG. 3A is a schematic diagram of an embodiment of an evaluation data unit. As shown in FIG. 3A, the evaluation data unit type is added to a type of a frame header of a media access control (MAC), and a combination of one or more evaluation parameters of the evaluation data unit such as T1, T2, and T3 measured at a sender (that is, the first communication node) is added to a frame body of the MAC; or the independent evaluation data unit may not carry evaluation parameter information; or the frame body may also carry the timestamps before and when the evaluation data unit is sent. An MAC frame may be based on Institute of Electrical and Electronics Engineers (IEEE) 802.11. FCS in FIG. 3A denotes a frame check sequence.

A frame header of a second data frame where the dependent evaluation data unit is located indicates that the second data frame carries evaluation data, and/or the frame header of the second data frame carries the identifier of the evaluation data unit. That is, the frame header of the second data frame indicates that the second data frame carries the evaluation data, and/or the frame header of the second data frame carries the identifier of the evaluation data unit. In this embodiment, the dependent evaluation data unit does not carry the evaluation parameter and the timestamps.

The frame header of the second data frame includes at least one of the following: the first evaluation parameter, the second evaluation parameter, the third evaluation parameter, or the timestamps before and when the evaluation data unit is sent.

Figure 3B:
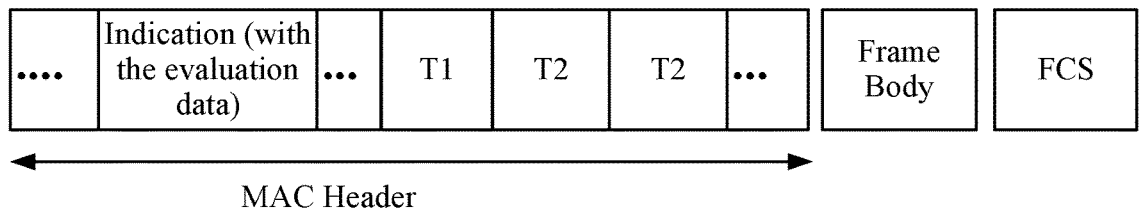
FIG. 3B is a schematic diagram of another embodiment of an evaluation data unit.

FIG. 3B is a schematic diagram of another embodiment of an evaluation data unit. As shown in FIG. 3B, an identifier is added to a frame header of the existing service data unit or management and control unit so as to indicate that this frame has the evaluation data, and a combination of one or more evaluation parameters of the frame such as T1, T2, and T3 measured at the sender is added; or the dependent evaluation data unit may not carry an evaluation data identifier and the evaluation parameter information; or a frame header of the frame may also carry the timestamps before and when the evaluation data unit is sent.

In an embodiment, the evaluation feedback data unit includes at least one of the following: the fourth evaluation parameter, the fifth evaluation parameter, a timestamp when the evaluation data unit is received, or an identifier of a corresponding evaluation data unit. The evaluation feedback data unit is used for feeding back delay data after the evaluation data unit is sent and received. The evaluation data unit here refers to the evaluation data unit corresponding to the evaluation feedback data unit.

The timestamp when the evaluation data unit is received includes a timestamp of the time point when the evaluation data unit is initially received or a timestamp of the time point when the retransmitted evaluation data unit is received.

In a first implementation manner, the evaluation feedback data unit may only include the identifier of the corresponding evaluation data unit.

In a second implementation manner, the evaluation feedback data unit may include at least one of the fourth evaluation parameter or the fifth evaluation parameter and the identifier of the corresponding evaluation data unit.

In a third implementation manner, the evaluation feedback data unit may include a timestamp when the corresponding evaluation data unit is received and the identifier of the corresponding evaluation data unit.

The evaluation feedback data unit further includes the delay evaluation parameter caused by the internal communication contention or control of the BSS and/or the delay evaluation parameter caused by the external interference of the BSS, that is, the evaluation feedback data unit may also include $T_{in}$ and/or $T_{out}$.

Based on content included in the evaluation feedback data unit, the evaluation feedback data unit may also have other implementation manners, which are not listed one by one here.

In an embodiment, encapsulation of the evaluation feedback data unit may be implemented in two manners. One is an independent evaluation feedback data unit, which is specially used for feeding back the evaluation data. The other is a dependent feedback evaluation data unit, which may be formed by adding an evaluation feedback identifier and an evaluation parameter field to an existing acknowledgment (ACK) frame.

A frame header of a third data frame where the independent evaluation feedback data unit is located indicates that a type of the third data frame is an evaluation feedback data unit type, and/or the frame header of the third data frame carries the identifier of the corresponding evaluation data unit. That is, the frame header of the third data frame indicates that the type of the third data frame is the evaluation feedback data unit type, and/or the frame header of the third data frame carries the identifier of the corresponding evaluation data unit. In this embodiment, the independent evaluation feedback data unit does not carry the evaluation parameter and the timestamps.

A frame body of the third data frame includes at least one of the following: the fourth evaluation parameter, the fifth evaluation parameter, or the timestamp when the evaluation data unit is received.

Figure 4A:
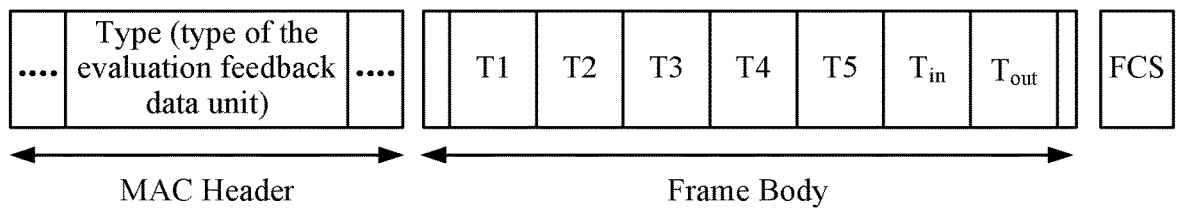
FIG. 4A is a schematic diagram of an embodiment of an evaluation feedback data unit.

FIG. 4A is a schematic diagram of an embodiment of an evaluation feedback data unit. As shown in FIG. 4A, the evaluation feedback data unit type is added to a type of the frame header of the MAC, and a combination of 0 or one or more evaluation parameters such as T4, T5, $T_{in}$, and $T_{out}$ is added to the frame body of the MAC based on 0 or one or more parameters such as T1, T2, and T3 embodied in the corresponding evaluation data unit.

A frame header of a fourth data frame where the dependent feedback evaluation data unit is located indicates that the fourth data frame carries evaluation feedback data, and/or the frame header of the fourth data frame carries the identifier of the corresponding evaluation data unit. That is, the frame header of the fourth data frame indicates that the fourth data frame carries the evaluation feedback data, and/or the frame header of the fourth data frame carries the identifier of the corresponding evaluation data unit. In this embodiment, the dependent feedback evaluation data unit does not carry the evaluation parameter and the timestamps.

The frame header of the fourth data frame includes at least one of the following: the fourth evaluation parameter, the fifth evaluation parameter, or the timestamp when the evaluation data unit is received.

Figure 4B:
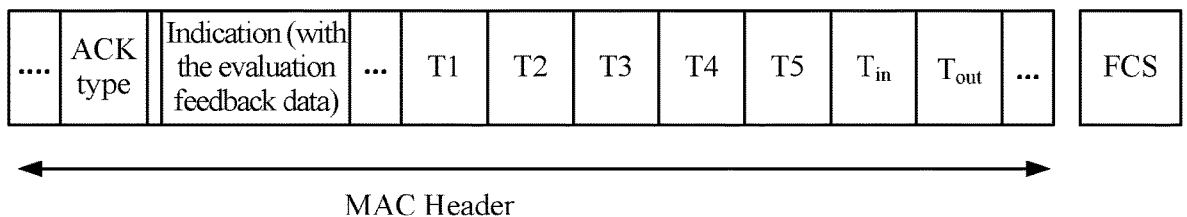
FIG. 4B is a schematic diagram of another embodiment of an evaluation feedback data unit.

FIG. 4B is a schematic diagram of another embodiment of an evaluation feedback data unit. As shown in FIG. 4B, an identifier is added to a frame header of an ACK frame corresponding to the evaluation data unit so as to indicate that this frame carries the evaluation feedback data (for example, this frame carries the evaluation parameter) or no identifier is added (for example, this frame does not carry the evaluation data), and a combination of 0 or one or more evaluation parameters such as T4, T5, $T_{in}$, and $T_{out}$ is added based on 0 or one or more parameters such as T1, T2, and T3 embodied in the corresponding the evaluation data unit.

An implementation process in 103 may be the following. The first communication node acquires, according to a transmission condition of the evaluation data unit and the evaluation feedback data unit, a delay evaluation parameter caused by internal communication contention or control of a BSS and/or a delay evaluation parameter caused by an external interference of the BSS. The transmission condition of the evaluation data unit may be determined by at least one of the first evaluation parameter, the second evaluation parameter, or the third evaluation parameter that are locally stored, or may be determined according to the timestamps before and when the locally stored evaluation data unit is sent, or may be determined according to an evaluation parameter carried in the evaluation data unit. According to at least one of an evaluation parameter carried in the evaluation feedback data unit, a timestamp carried in the evaluation feedback data unit, or a time when the evaluation feedback data unit is received (that is, a time when the first communication node receives the evaluation feedback data unit from the second communication node) and the transmission condition of the evaluation data unit, the first communication node acquires the delay evaluation parameter caused by the internal communication contention or control of the BSS and/or the delay evaluation parameter caused by the external interference of the BSS. In a scenario where the evaluation feedback data unit includes $T_{in}$ and $T_{out}$, the first communication node determines, according to $T_{in}$ carried in the evaluation feedback data unit, the delay evaluation parameter caused by the internal communication contention or control of the BSS and determines, according to $T_{out}$, the delay evaluation parameter caused by the external interference of the BSS.

Based on the implementation manner of the evaluation data unit and the evaluation feedback data unit, 103 has implementation manners described below.

In a first implementation manner, in the case where the evaluation data unit includes at least one of the first evaluation parameter, the second evaluation parameter, the third evaluation parameter, or the identifier of the evaluation data unit and the evaluation feedback data unit includes at least one of the fourth evaluation parameter, the fifth evaluation parameter, or the identifier of the corresponding evaluation data unit, the implementation process in 103 may be the following. The first communication node determines, according to the evaluation parameter carried in the evaluation feedback data unit and the evaluation parameter carried in the evaluation data unit, the delay evaluation parameter caused by the internal communication contention or control of the BSS and/or the delay evaluation parameter caused by the external interference of the BSS.

In this implementation manner, according to a composition of the delay evaluation parameter caused by the internal communication contention or control of the BSS and according to the evaluation parameter carried in the evaluation feedback data unit and the evaluation parameter carried in the evaluation data unit, the first communication node may determine the delay evaluation parameter caused by the internal communication contention or control of the BSS.

According to a composition of the delay evaluation parameter caused by the external interference of the BSS and according to the evaluation parameter carried in the evaluation feedback data unit and the evaluation parameter carried in the evaluation data unit, the first communication node may determine the delay evaluation parameter caused by the external interference of the BSS.

In a second implementation manner, in the case where the evaluation feedback data unit carries the evaluation parameter and the identifier of the corresponding evaluation data unit or the evaluation feedback data unit does not carry the evaluation parameter, the implementation process of 103 is the following. The first communication node determines, according to at least one of the evaluation parameter carried in the evaluation feedback data unit or the time when the evaluation feedback data unit is received and at least one of the first evaluation parameter, the second evaluation parameter, or the third evaluation parameter that are locally stored, the delay evaluation parameter caused by the internal communication contention or control of the BSS and/or the delay evaluation parameter caused by the external interference of the BSS.

In this implementation manner, according to at least one of the evaluation parameter carried in the evaluation feedback data unit or the time when the evaluation feedback data unit is received and the timestamps before and when the locally stored evaluation data unit is sent, the delay evaluation parameter caused by the internal communication contention or control of the BSS and/or the delay evaluation parameter caused by the external interference of the BSS are determined.

In a third implementation manner, in the case where the evaluation data unit includes the timestamps before and when the evaluation data unit is sent, the implementation process in 103 is the following. The first communication node determines, according to at least one of the timestamp carried in the evaluation feedback data unit or the time when the evaluation feedback data unit is received and the timestamp carried in the evaluation data unit, the delay evaluation parameter caused by the internal communication contention or control of the BSS and/or the delay evaluation parameter caused by the external interference of the BSS.

103 also has other implementation manners, which are not listed one by one here.

Figure 5:
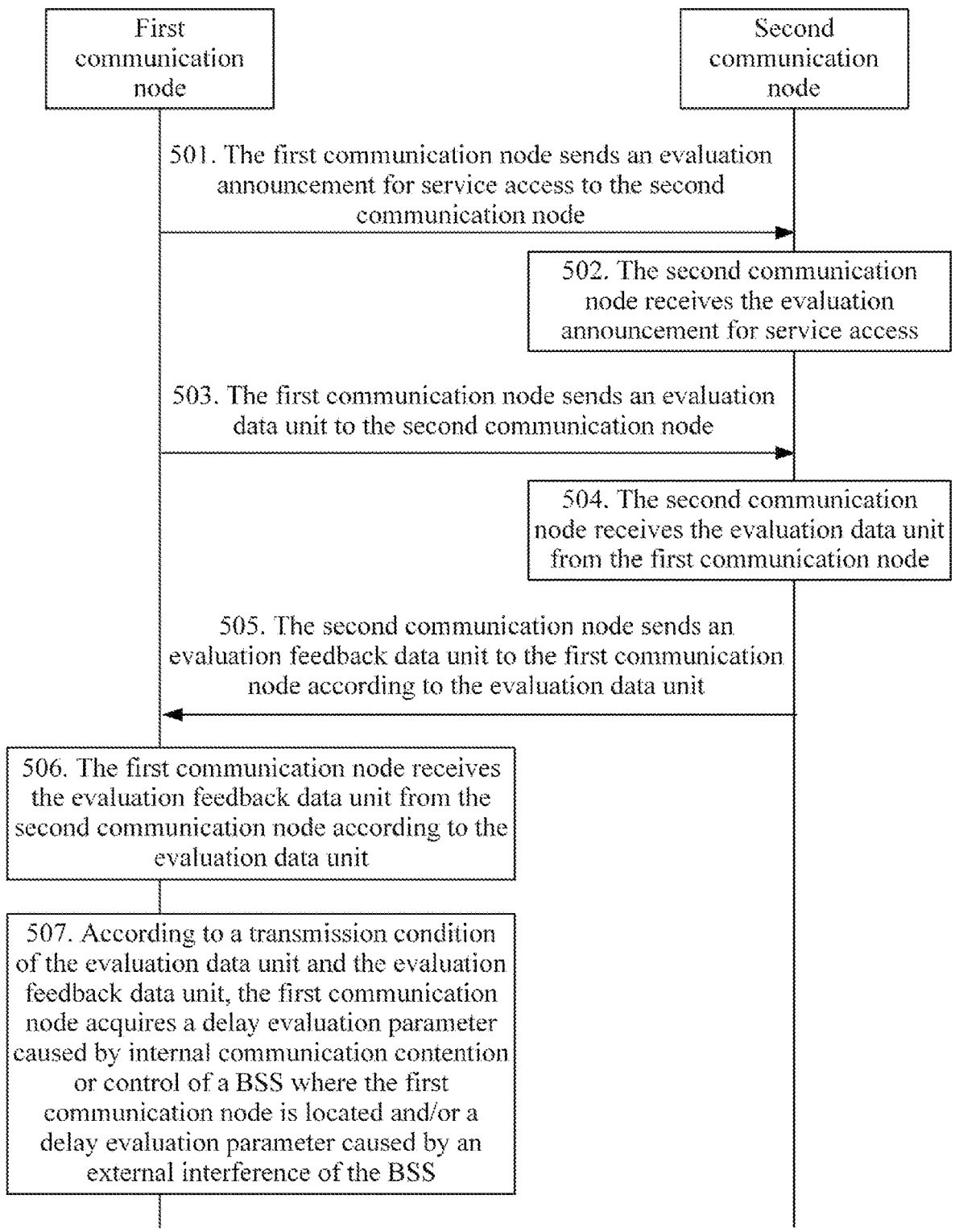
FIG. 5 is a flowchart of a delay performance evaluation method according to another embodiment.

Processes before 101 are described below. FIG. 5 is a flowchart of a delay performance evaluation method according to another embodiment. As shown in FIG. 5, this embodiment includes 501-507.

In 501, the first communication node sends an evaluation announcement for service access to the second communication node.

In 502, the second communication node receives the evaluation announcement for service access.

The evaluation announcement for service access is used for informing the second communication node that a service access evaluation is performed next, where the service access evaluation refers to a delay index evaluation between an AP and a non-AP STA to be evaluated in an uplink or downlink direction.

In 503, the first communication node sends an evaluation data unit to the second communication node.

In 504, the second communication node receives the evaluation data unit from the first communication node.

In 505, the second communication node sends an evaluation feedback data unit to the first communication node according to the evaluation data unit.

Based on different implementation forms of the evaluation feedback data unit, the second communication node may send evaluation feedback data units that are in different encapsulation forms and carry different contents to the first communication node.

In 506, the first communication node receives the evaluation feedback data unit from the second communication node according to the evaluation data unit.

In 507, according to a transmission condition of the evaluation data unit and the evaluation feedback data unit, the first communication node acquires a delay evaluation parameter caused by internal communication contention or control of a BSS where the first communication node is located and/or a delay evaluation parameter caused by an external interference of the BSS.

503 and 101, 506 and 102, and 507 and 103 have similar implementation processes and technical principles, which are not repeated here.

Figure 6:
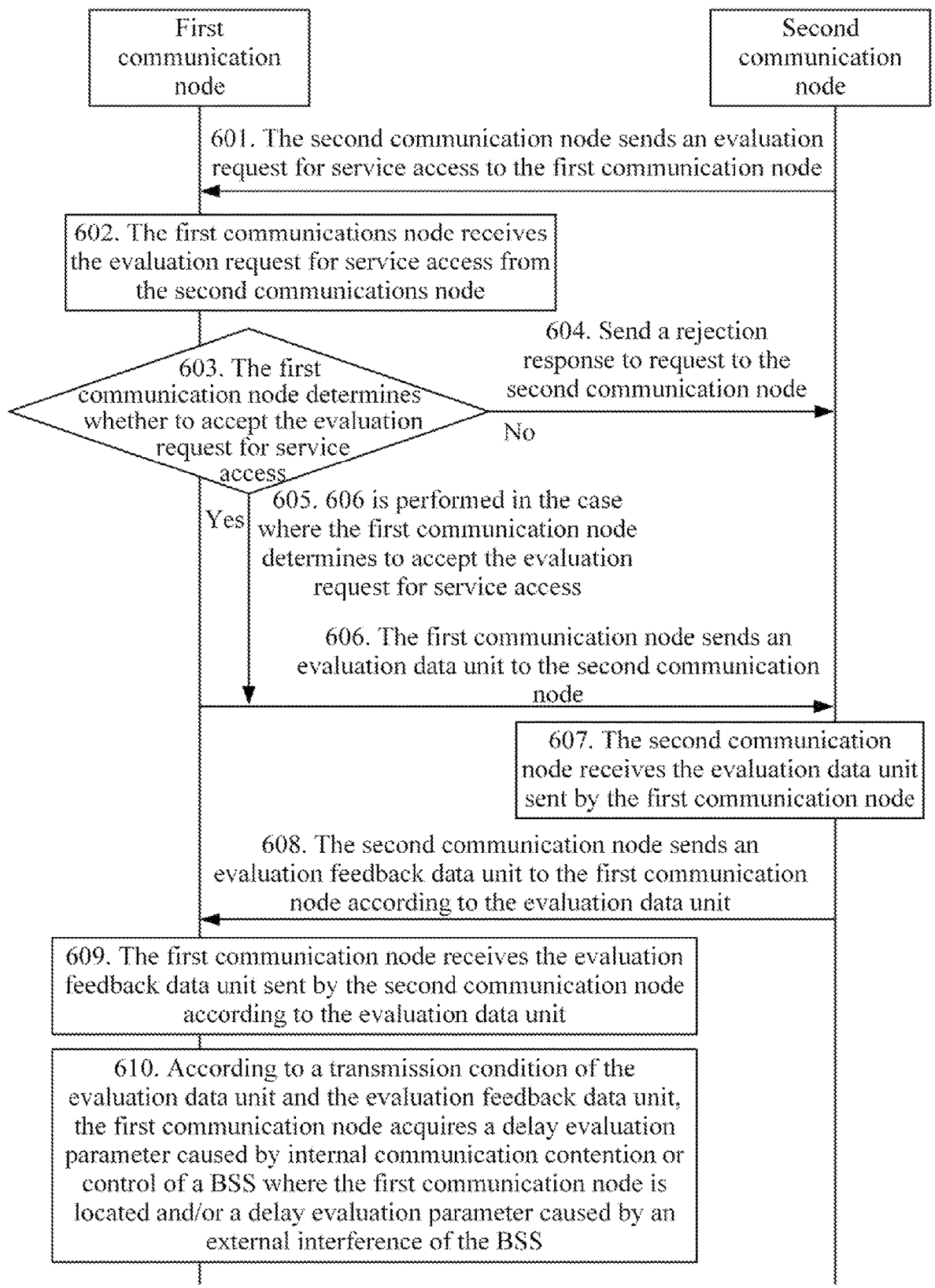
FIG. 6 is a flowchart of a delay performance evaluation method according to another embodiment.

FIG. 6 is a flowchart of a delay performance evaluation method according to another embodiment. As shown in FIG. 6, this embodiment includes 601-610.

In 601, the second communication node sends an evaluation request for service access to the first communication node.

In 602, the first communications node receives the evaluation request for service access from the second communications node.

In 603, the first communication node determines whether to accept the evaluation request for service access.

In 604, in the case where the first communication node rejects the evaluation request for service access, the first communication node sends a rejection response to request to the second communication node.

In 605, 606 is performed in the case where the first communication node determines to accept the evaluation request for service access.

In 606, the first communication node sends an evaluation data unit to the second communication node.

In 607, the second communication node receives the evaluation data unit from the first communication node.

In 608, the second communication node sends an evaluation feedback data unit to the first communication node according to the evaluation data unit.

Based on different implementation forms of the evaluation feedback data unit, the second communication node may send evaluation feedback data units that are in different encapsulation forms and carry different contents to the first communication node.

In 609, the first communication node receives the evaluation feedback data unit from the second communication node according to the evaluation data unit.

In 610, according to a transmission condition of the evaluation data unit and the evaluation feedback data unit, the first communication node acquires a delay evaluation parameter caused by internal communication contention or control of a BSS where the first communication node is located and/or a delay evaluation parameter caused by an external interference of the BSS.

606 and 101, 609 and 102, and 610 and 103 have similar implementation processes and technical principles, which are not repeated here.

In an embodiment, after 103, 507, and 610, the method further includes the following. The first communication node evaluates, according to the delay evaluation parameter caused by the internal communication contention or control of the BSS, a delay performance involved in an internal communication environment of the BSS; and/or the first communication node evaluates, according to the delay evaluation parameter caused by the external interference of the BSS, a delay performance involved in the external interference of the BSS.

In an embodiment, the first communication node may acquire a delay index of a service to be transmitted. The first communication node may acquire the delay index of the service to be transmitted from other communication nodes, and may also acquire the delay index of the service to be transmitted from a packet of the service to be transmitted.

The service to be transmitted in this embodiment may include a low-delay service.

Optionally, the delay index of the service to be transmitted includes a maximum downlink delay and a maximum uplink delay.

With continued reference to FIG. 2, in the case where a communication node 1 is an access point and a communication node 2 is a station, FIG. 2 shows a time point distribution of downlink (a direction from an AP to a non-AP STA) transmission, the BSS internal delay $T_{in}$ is marked as $T_{in\ downlink}$ (referred to as a downlink internal delay evaluation parameter), and the BSS external delay is marked as $T_{out\ downlink}$ (referred to as a downlink external delay evaluation parameter).

In the case where the communication node 1 is a station and the communication node 2 is an access point, FIG. 2 shows a time point distribution of uplink (a direction from a non-AP STA to an AP) transmission, the BSS internal delay is marked as $T_{in\ uplink}$ (referred to as an uplink internal delay evaluation parameter), and the BSS external delay is marked as $T_{out\ uplink}$ (referred to as an uplink external delay evaluation parameter).

That is, multiple evaluation data units are provided. The delay evaluation parameter caused by the internal communication contention or control of the BSS includes the uplink internal delay evaluation parameter and the downlink internal delay evaluation parameter; and the delay evaluation parameter caused by the external interference of the BSS includes the uplink external delay evaluation parameter and the downlink external delay evaluation parameter.

According to the delay index of the service to be transmitted, the delay performance in a current communication environment of WIFI is evaluated by using $T_{in\ downlink}$, $T_{in\ uplink}$, $T_{out\ downlink}$, and $T_{out\ uplink}$. It is assumed that the delay index of the service to be transmitted is represented as: the maximum downlink delay is $T_{downlink\ max}$, and the maximum uplink delay is $T_{uplink\ max}$. The BSS internal delays $T_{in}$ of an evaluation data unit 1, . . . , and an evaluation data unit n in a downlink direction obtained by measurement are respectively denoted as $T_{in\ downlink-1}$, $T_{in\ downlink-2}$, . . . , and $T_{in\ downlink-n}$. The BSS external delays $T_{out}$ of the evaluation data unit 1, . . . , and the evaluation data unit n are respectively denoted as $T_{out\ downlink-1}$, $T_{out\ downlink-2}$, . . . , and $T_{out\ downlink-n}$. The BSS internal delays $T_{in}$ of the evaluation data unit 1, . . . , and the evaluation data unit n in an uplink direction are respectively denoted as $T_{in\ uplink-1}$, $T_{in\ uplink-2}$, . . . , and $T_{in\ uplink-n}$. The BSS external delays $T_{out}$ of the evaluation data unit 1, . . . , and the evaluation data unit n are respectively denoted as $T_{out\ uplink-1}$, $T_{out\ uplink-2}$, . . . , and $T_{out\ uplink-n}$. It is assumed that a denotes the first preset value and b denotes the second preset value. A value of a is greater than 0 and less than or equal to 1, and a value of b is greater than 0 and less than or equal to 1. The evaluation methods are as follows.

In a first method, evaluation is performed through a maximum transmission delay of the evaluation data unit.

(1) In the case where $\max(T_{in\ downlink-1}, T_{in\ downlink-2}, \ldots, \text{and } T_{in\ downlink-n}) > a\ T_{downlink\ max}$, it indicates that busyness of the internal communication environment of the BSS is a main factor affecting a downlink delay, where $\max(T_{in\ downlink-1}, T_{in\ downlink-2}, \ldots, \text{and } T_{in\ downlink-n})$ denotes a maximum value among $T_{in\ downlink-1}$, $T_{in\ downlink-2}$, . . . , and $T_{in\ downlink-n}$, and the following is similar.

(2) In the case where $\max(T_{out\ downlink-1}, T_{out\ downlink-2}, \ldots, \text{and } T_{out\ downlink-n}) > b\ T_{downlink\ max}$, it indicates that interference of an external factor of the BSS is a main factor affecting the downlink delay.

(3) In the case where $\max(T_{in\ uplink-1}, T_{in\ uplink-2}, \ldots, \text{and } T_{in\ uplink-n}) > a\ T_{uplink\ max}$, it indicates that the busyness of the internal communication environment of the BSS is a main factor affecting an uplink delay.

(4) In the case where $\max(T_{out\ uplink-1}, T_{out\ uplink-2}, \ldots, \text{and } T_{out\ uplink-n}) > b\ T_{uplink\ max}$, it indicates that the interference of the external factor of the BSS is a main factor affecting the uplink delay.

In a second method, evaluation is performed through an average transmission delay of the evaluation data unit.

(1) In the case where $\mathrm{avg}(T_{in\ downlink-1}, T_{in\ downlink-2}, \ldots, \text{and } T_{in\ downlink-n}) > a\ T_{downlink\ max}$, it indicates that the busyness of the internal communication environment of the BSS is a main factor affecting a downlink delay, where $\mathrm{avg}(T_{in\ downlink-1}, T_{in\ downlink-2}, \ldots, \text{and } T_{in\ downlink-n})$ denotes an average value of $T_{in\ downlink-1}$, $T_{in\ downlink-2}$, . . . , and $T_{in\ downlink-n}$, and the following is similar.

(2) In the case where $\mathrm{avg}(T_{out\ downlink-1}, T_{out\ downlink-2}, \ldots, \text{and } T_{out\ downlink-n}) > b\ T_{downlink\ max}$, it indicates that the interference of the external factor of the BSS is a main factor affecting the downlink delay.

(3) In the case where $\mathrm{avg}(T_{in\ uplink-1}, T_{in\ uplink-2}, \ldots, \text{and } T_{in\ uplink-n}) > a\ T_{uplink\ max}$, it indicates that the busyness of the internal communication environment of the BSS is a main factor affecting an uplink delay.

(4) In the case where $\mathrm{avg}(T_{out\ uplink-1}, T_{out\ uplink-2}, \ldots, \text{and } T_{out\ uplink-n}) > b\ T_{uplink\ max}$, it indicates that the interference of the external factor of the BSS is a main factor affecting the uplink delay.

In an embodiment, after 103, 507, and 610, the method further includes the following. According to the delay evaluation parameter caused by the internal communication contention or control of the BSS and/or the delay evaluation parameter caused by the external interference of the BSS, the first communication node acquires a delay performance evaluation result of whether a service to be transmitted is capable of accessing a current communication environment.

In the case where the first communication node determines that a maximum value or an average value of a sum of the uplink internal delay evaluation parameter and the uplink external delay evaluation parameter corresponding to a same evaluation data unit among the multiple evaluation data units is greater than a maximum uplink delay index of the service to be transmitted, the first communication node determines that the current communication environment does not satisfy the maximum uplink delay index of the service to be transmitted.

In the case where the first communication node determines that a maximum value or an average value of a sum of the downlink internal delay evaluation parameter and the downlink external delay evaluation parameter corresponding to a same evaluation data unit among the multiple evaluation data units is greater than a maximum downlink delay index of the service to be transmitted, the first communication node determines that the current communication environment does not satisfy the maximum downlink delay index of the service to be transmitted.

In an embodiment, it is also feasible that according to the delay index of the service to be transmitted, a support capability of the service to be transmitted in the current communication environment of WIFI is evaluated by using $T_{in\ downlink}$, $T_{in\ uplink}$, $T_{out\ downlink}$, and $T_{out\ uplink}$. Evaluation may also be performed through two methods.

In a first method, the evaluation is performed by using the maximum value of the sum of the uplink internal delay evaluation parameter and the uplink external delay evaluation parameter corresponding to a same evaluation data unit in the multiple evaluation data units.

(1) In the case where $\max(T_{in\ uplink-1} + T_{out\ uplink-1}, T_{in\ uplink-2} + T_{out\ uplink-2}, \ldots, \text{and } T_{in\ uplink-n} + T_{out\ uplink-n}) > T_{uplink\ max}$, it indicates that the current communication environment does not satisfy a maximum uplink delay requirement of the service to be transmitted.

(2) In the case where $\max(T_{in\ downlink-1}+T_{out\ downlink-1}, T_{in\ downlink-2}+T_{out\ downlink-2}, \ldots,$ and $T_{in\ downlink-n}+T_{out\ downlink-n})>T_{downlink\ max}$, it indicates that the current communication environment does not satisfy a maximum downlink delay requirement of the service to be transmitted.

In a second method, the evaluation is performed by using the average value of the sum of the uplink internal delay evaluation parameter and the uplink external delay evaluation parameter corresponding to a same evaluation data unit in the multiple evaluation data units.

(1) In the case where $\text{avg}(T_{in\ uplink-1}+T_{out\ uplink-1}, T_{in\ uplink-2}+T_{out\ uplink-2}, \ldots,$ and $T_{in\ uplink-n}+T_{out\ uplink-n})>T_{uplink\ max}$, it indicates that the current communication environment does not satisfy the maximum uplink delay requirement of the service to be transmitted.

(2) In the case where $\text{avg}(T_{in\ downlink-1}+T_{out\ downlink-1}, T_{in\ downlink-2}+T_{out\ downlink-2}, \ldots,$ and $T_{in\ downlink-n}+T_{out\ downlink-n})>T_{downlink\ max}$, it indicates that the current communication environment does not satisfy the maximum downlink delay requirement of the service to be transmitted.

A sum $T_{in\ uplink}+T_{out\ uplink}$ of an uplink internal delay and an uplink external delay corresponding to each evaluation data unit among the multiple evaluation data units may be calculated. The number of the evaluation data units is the same as the number of sums of uplink internal delays and uplink external delays. In the case where a maximum value or an average value of these sums is greater than the maximum uplink delay of the service to be transmitted, the first communication node determines that the current communication environment does not satisfy the maximum uplink delay of the service to be transmitted.

Similarly, a sum $T_{in\ downlink}+T_{out\ downlink}$ of a downlink internal delay and a downlink external delay corresponding to each evaluation data unit among the multiple evaluation data units may be calculated. The number of the evaluation data units is the same as the number of sums of downlink internal delays and downlink external delays. In the case where a maximum value or an average value of these sums is greater than the maximum downlink delay of the service to be transmitted, the first communication node determines that the current communication environment does not satisfy the maximum downlink delay of the service to be transmitted.

It is to be understood that, in the case where the first communication node determines that the current communication environment does not satisfy the maximum uplink delay of the service to be transmitted, or in the case where the first communication node determines that the current communication environment does not satisfy the maximum downlink delay of the service to be transmitted, it is determined that the delay performance evaluation result is that the current communication environment cannot achieve access to the service to be transmitted. In the case where the first communication node determines that the current communication environment does not satisfy the maximum uplink delay of the service to be transmitted, or in the case where the first communication node determines that the current communication environment does not satisfy the maximum downlink delay of the service to be transmitted, it is determined that the delay performance evaluation result is that the current communication environment may achieve access to the service to be transmitted.

In an embodiment, after according to the delay evaluation parameter caused by the internal communication contention or control of the BSS and/or the delay evaluation parameter caused by the external interference of the BSS, the first communication node acquires the delay performance evaluation result of whether the service to be transmitted is capable of accessing the current communication environment, the method further includes sending, by the first communication node, the delay performance evaluation result (Response of evaluation result) to the second communication node.

In an embodiment, before 101, the method further includes establishing, by the first communication node, an evaluation queue according to a contention parameter. The evaluation queue includes the evaluation data unit, and the contention parameter includes an access category, a maximum contention window, a minimum contention window, and an arbitration interframe space number.

Figure 7:
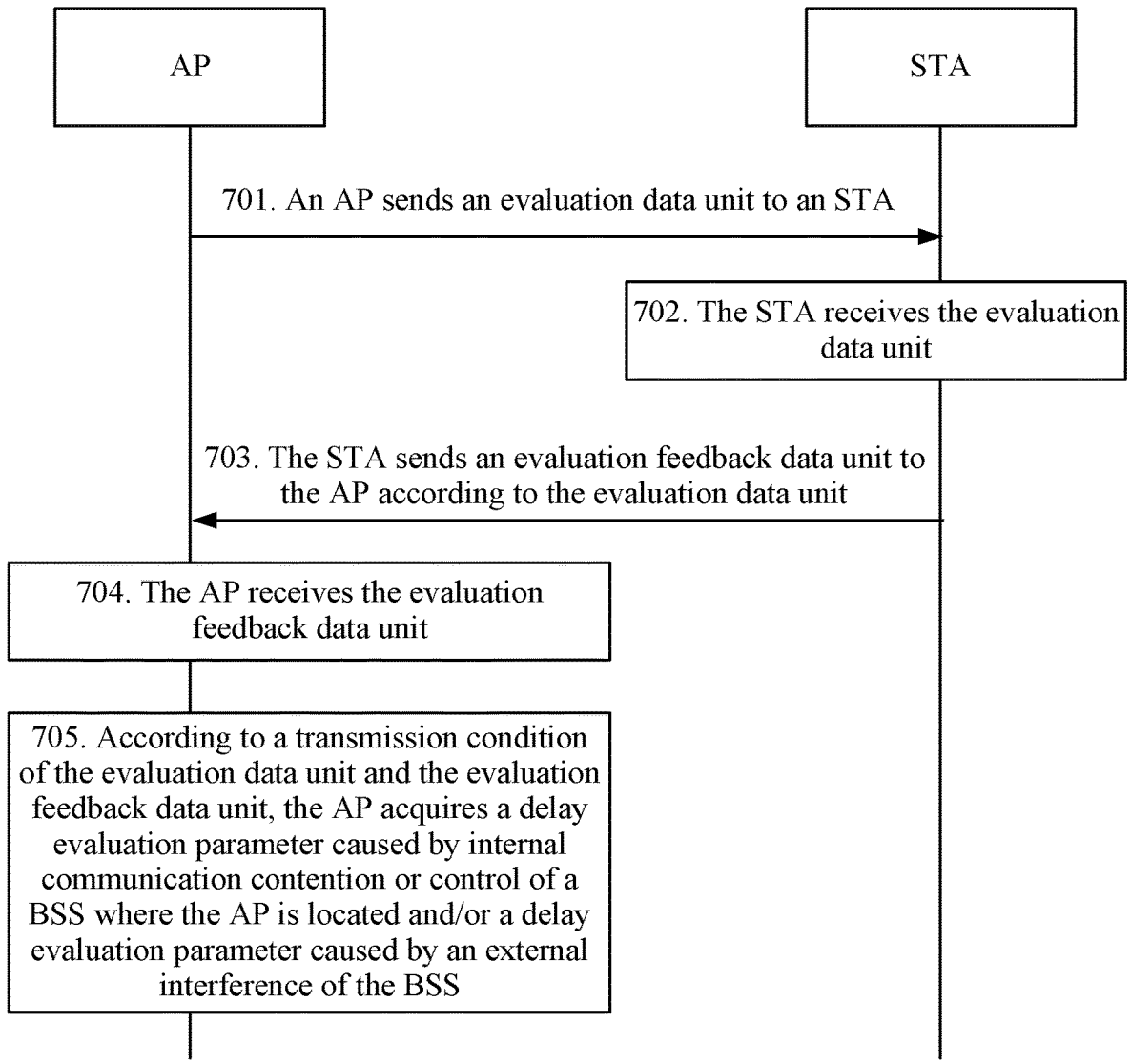
FIG. 7 is a flowchart of a downlink delay performance evaluation method according to an embodiment.

FIG. 7 is a flowchart of a downlink delay performance evaluation method according to an embodiment. In this embodiment, the first communication node is an AP, and the second communication node is an STA. As shown in FIG. 7, the downlink delay performance evaluation method according to this embodiment includes 701-705.

In 701, an AP sends an evaluation data unit to an STA.

In 702, the STA receives the evaluation data unit.

In 703, the STA sends an evaluation feedback data unit to the AP according to the evaluation data unit.

In 704, the AP receives the evaluation feedback data unit.

In 705, according to a transmission condition of the evaluation data unit and the evaluation feedback data unit, the AP acquires a delay evaluation parameter caused by internal communication contention or control of a BSS where the AP is located and/or a delay evaluation parameter caused by an external interference of the BSS.

For downlink delay evaluation, when service access capability evaluation is performed, the AP first completes clock and time synchronization before one or more non-AP STAs to be evaluated, and then according to contention parameters such as the access type (AC), the maximum contention window (CWmax), the minimum contention window (CWmin), and the arbitration interframe space number (AIFSN), the AP establishes a corresponding evaluation queue and an independent evaluation data unit, or selects one or more existing sending queues and inserts an independent evaluation data unit into the one or more existing sending queues for evaluation, and at the same time, the AP may also insert a corresponding evaluation identifier and a corresponding evaluation parameter field into data units in the existing sending queues so as to form dependent evaluation data units. The inserted evaluation parameter fields such as T1, T2, and T3 denote an evaluation data unit station internal queue waiting time, the BSS internal waiting time, and the BSS external waiting time, respectively; or the evaluation data unit does not carry the evaluation parameter, and the evaluation parameter is recorded locally after obtained. After forming the evaluation data unit, the AP sends the evaluation data unit to a station to be evaluated (a non-AP STA). After receiving the evaluation data unit, the non-AP STA forms the evaluation feedback data unit. In the case where the evaluation data unit has one or more evaluation parameters such as T1, T2, and T3, a relevant evaluation parameter may be acquired in a corresponding field of the evaluation data unit, and one or more T4, T5, $T_{in}$, or $T_{out}$ of the evaluation feedback data unit is determined according to a time when the evaluation data unit is received. The evaluation feedback data unit may carry or not carry relevant evaluation parameters. After formed, the evaluation feedback data unit is sent to the AP, and the AP extracts the relevant evaluation parameters from the evaluation feedback data unit or acquires the relevant evaluation parameters according to the time when the evaluation feedback data unit is received and a previous evaluation parameter record of the evaluation data unit. To obtain a more accurate and comprehensive evaluation result, the AP may send multiple evaluation data units to the non-AP STA to be evaluated and receive multiple evaluation feedback data units correspondingly, so as to acquire downlink delays of multiple packets.

Figure 8:
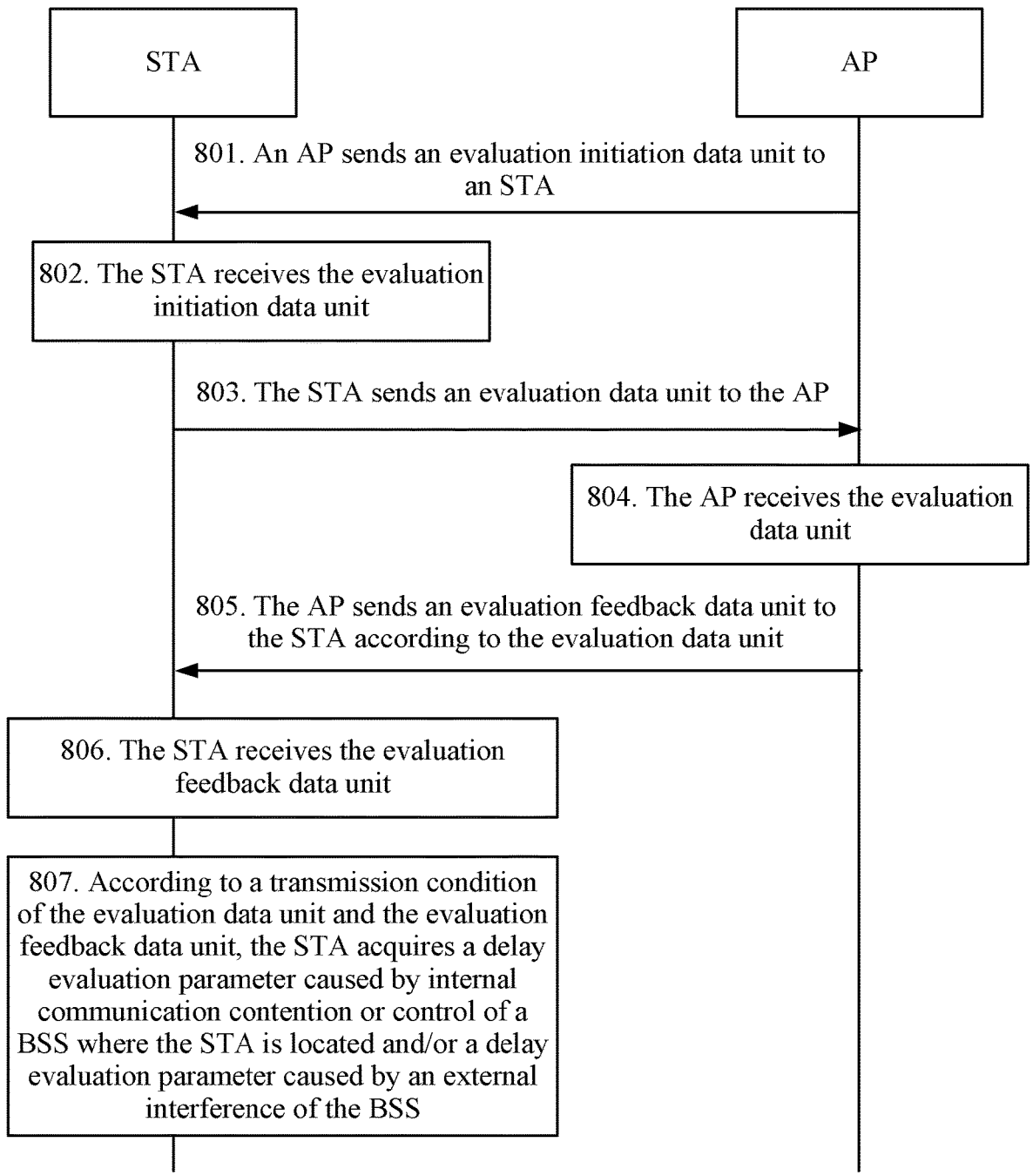
FIG. 8 is a flowchart of an uplink delay performance evaluation method according to an embodiment.

FIG. 8 is a flowchart of an uplink delay performance evaluation method according to an embodiment. As shown in FIG. 8, in this embodiment, the first communication node is an STA, and the second communication node is an AP. As shown in FIG. 8, the uplink delay performance evaluation method according to this embodiment includes 801-S07.

In 801, an AP sends an evaluation initiation data unit to an STA.

In 802, the STA receives the evaluation initiation data unit.

In 803, the STA sends an evaluation data unit to the AP.

In 804, the AP receives the evaluation data unit.

In 805, the AP sends an evaluation feedback data unit to the STA according to the evaluation data unit.

In 806, the STA receives the evaluation feedback data unit.

In 807, according to a transmission condition of the evaluation data unit and the evaluation feedback data unit, the STA acquires a delay evaluation parameter caused by internal communication contention or control of a BSS where the STA is located and/or a delay evaluation parameter caused by an external interference of the BSS.

The AP sends the evaluation initiation data unit to one or more non-AP STAs to be evaluated, where the evaluation initiation data unit carries optional synchronization time data, as well as a specific type of a data contention parameter to be evaluated, and/or a number of evaluation feedback data units to be fed back and time intervals between the evaluation feedback data units. The contention parameter includes one or more of the following: the AC, the CWmax, the CWmin, the AIFSN, or the like. After receiving the evaluation initiation data unit, the station to be evaluated (the non-AP STA) establishes a corresponding evaluation queue and an independent evaluation data unit, or selects one or more of the existing sending queues and inserts an independent evaluation data unit into the one or more of the existing sending queues for evaluation, and at the same time, the non-AP STA may also insert a corresponding evaluation identifier and a corresponding evaluation parameter field into the data units in the existing sending queues so as to form dependent evaluation data units; the inserted evaluation parameters may be one or more of T1, T2, or T3, where T1, T2, and T3 denote the evaluation data unit station internal queue waiting time, the BSS internal waiting time, and the BSS external waiting time, respectively. The non-AP STA forms the evaluation data unit and sends the evaluation data unit to the AP; after receiving the evaluation data unit, the AP may acquire one or more corresponding evaluation parameters such as T1, T2, and T3 and determine T4, T5, $T_{in}$, and $T_{out}$ according to the time when the evaluation data unit is received. The AP may also form an evaluation feedback data unit into which one or more of corresponding evaluation parameters such as T1, T2, T3, T4, T5, $T_{in}$, and $T_{out}$ are inserted and send the evaluation feedback data unit to the non-AP STA. To obtain a more accurate and comprehensive evaluation result, the non-AP STA to be evaluated may send multiple evaluation data units to the AP and receive multiple corresponding evaluation feedback data units, so as to acquire uplink delays of multiple packets.

The present application provides a delay performance evaluation method. The method includes the followings. The first communication node sends an evaluation data unit to a second communication node and receives an evaluation feedback data unit which sent by the second communication node and sent according to the evaluation data unit, and the first communication node acquires, according to a transmission condition of the evaluation data unit and the evaluation feedback data unit, a delay evaluation parameter caused by internal communication contention or control of a BSS where the first communication node is located and/or a delay evaluation parameter caused by an external interference of the BSS, so as to evaluate a delay performance of a communication environment of the BSS and provide an evaluation basis for adjustment and optimization of service access strategies and methods, thereby achieving access to low-delay services.

Figure 9:
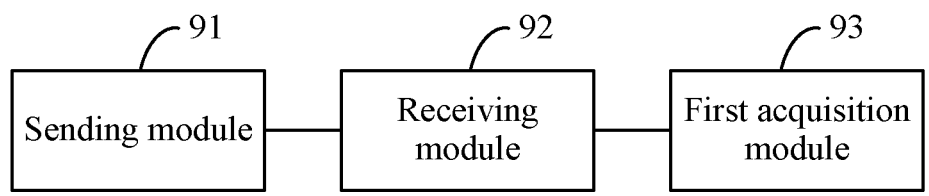
FIG. 9 is a structural diagram of a delay performance evaluation apparatus according to an embodiment.

FIG. 9 is a structural diagram of a delay performance evaluation apparatus according to an embodiment. The delay performance evaluation apparatus may be set in a first communication node. As shown in FIG. 9, the delay performance evaluation apparatus provided in this embodiment includes the following modules: a sending module 91, a receiving module 92, and a first acquisition module 93.

The sending module 91 is configured to send an evaluation data unit to a second communication node.

The receiving module 92 is configured to receive an evaluation feedback data unit which is sent by the second communication node and sent according to the evaluation data unit.

The first acquisition module 93 is configured to, according to a transmission condition of the evaluation data unit and the evaluation feedback data unit, acquire a delay evaluation parameter caused by internal communication contention or control of a BSS where the first communication node is located and/or a delay evaluation parameter caused by an external interference of the BSS.

In an embodiment, the delay evaluation parameter caused by the internal communication contention or control of the BSS includes at least one of a first evaluation parameter, a second evaluation parameter, or a fourth evaluation parameter.

The first evaluation parameter is used for indicating a time period between a time point when the evaluation data unit enters a sending queue and a waiting start point for the evaluation data unit to be sent.

The second evaluation parameter is used for indicating a time period of waiting for other communication nodes other than the communication node in the BSS where the first communication node is located to transmit data in a time period between a time point when the evaluation data unit starts to be transmitted on a network and the waiting start point for the evaluation data unit to be sent.

The fourth evaluation parameter is used for indicating a time period between a time point when the evaluation data unit is initially received and the time point when the evaluation data unit starts to be transmitted on the network.

In an embodiment, the delay evaluation parameter caused by the external interference of the BSS includes a third evaluation parameter and/or a fifth evaluation parameter.

The third evaluation parameter is used for indicating a time period of waiting due to transmission of a communication node in an OBSS outside the BSS in the time period between the time point when the evaluation data unit starts to be transmitted on the network and the waiting start point for the evaluation data unit to be sent.

The fifth evaluation parameter is used for indicating a time period between a time point when a retransmitted evaluation data unit is received and the time point when the evaluation data unit starts to be transmitted on the network in a case where initial transmission of the evaluation data unit fails.

In an embodiment, the evaluation data unit includes at least one of the following: the first evaluation parameter, the second evaluation parameter, the third evaluation parameter, timestamps before and when the evaluation data unit is sent, or an identifier of the evaluation data unit.

The timestamps before and when the evaluation data unit is sent include a timestamp of the waiting start point for the evaluation data unit to be sent, a timestamp of the time point when the evaluation data unit enters the sending queue, a timestamp of a starting time point of evaluation data unit BSS internal waiting, a timestamp of an end time point of the evaluation data unit BSS internal waiting, a timestamp of a starting time point of evaluation data unit BSS external waiting, a timestamp of an end time point of the evaluation data unit BSS external waiting, and a timestamp of the time point when the evaluation data unit starts to be transmitted on the network.

In an embodiment, the evaluation feedback data unit includes at least one of the following: the fourth evaluation parameter, the fifth evaluation parameter, a timestamp when the evaluation data unit is received, or an identifier of a corresponding evaluation data unit.

The timestamp when the evaluation data unit is received includes a timestamp of the time point when the evaluation data unit is initially received or a timestamp of the time point when the retransmitted evaluation data unit is received.

The evaluation feedback data unit further includes the delay evaluation parameter caused by the internal communication contention or control of the BSS and/or the delay evaluation parameter caused by the external interference of the BSS.

In an embodiment, in the case where the evaluation data unit includes at least one of the first evaluation parameter, the second evaluation parameter, the third evaluation parameter, or the identifier of the evaluation data unit and the evaluation feedback data unit includes at least one of the fourth evaluation parameter, the fifth evaluation parameter, or the identifier of the corresponding evaluation data unit, the first acquisition module 93 is configured to, according to the evaluation parameter carried in the evaluation feedback data unit and the evaluation parameter carried in the evaluation data unit, determine the delay evaluation parameter caused by the internal communication contention or control of the BSS and/or the delay evaluation parameter caused by the external interference of the BSS.

In another embodiment, the first acquisition module 93 is configured to, according to at least one of the evaluation parameter carried in the evaluation feedback data unit or a time when the evaluation feedback data unit is received and at least one of the first evaluation parameter, the second evaluation parameter, or the third evaluation parameter that are locally stored, determine the delay evaluation parameter caused by the internal communication contention or control of the BSS and/or the delay evaluation parameter caused by the external interference of the BSS.

In another embodiment, in the case where the evaluation data unit includes the timestamps before and when the evaluation data unit is sent, the first acquisition module 93 is configured to, according to at least one of the timestamp carried in the evaluation feedback data unit or the time when the evaluation feedback data unit is received and the timestamp carried in the evaluation data unit, determine the delay evaluation parameter caused by the internal communication contention or control of the BSS and/or the delay evaluation parameter caused by the external interference of the BSS.

In an embodiment, the evaluation data unit includes an independent evaluation data unit. A frame header of a first data frame where the independent evaluation data unit is located indicates that a type of the first data frame is an evaluation data unit type, and/or the frame header of the first data frame carries the identifier of the evaluation data unit.

A frame body of the first data frame includes at least one of the following: the first evaluation parameter, the second evaluation parameter, the third evaluation parameter, or timestamps before and when the evaluation data unit is sent.

In an embodiment, the evaluation data unit includes a dependent evaluation data unit. A frame header of a second data frame where the dependent evaluation data unit is located indicates that the second data frame carries evaluation data, and/or the frame header of the second data frame carries the identifier of the evaluation data unit.

The frame header of the second data frame includes at least one of the following: the first evaluation parameter, the second evaluation parameter, the third evaluation parameter, or the timestamps before and when the evaluation data unit is sent.

In an embodiment, the evaluation feedback data unit includes an independent evaluation feedback data unit. A frame header of a third data frame where the independent evaluation feedback data unit is located indicates that a type of the third data frame is an evaluation feedback data unit type, and/or the frame header of the third data frame carries the identifier of the corresponding evaluation data unit.

A frame body of the third data frame includes at least one of the following: the fourth evaluation parameter, the fifth evaluation parameter, or the timestamp when the evaluation data unit is received.

In an embodiment, the evaluation feedback data unit includes a dependent feedback evaluation data unit. A frame header of a fourth data frame where the dependent feedback evaluation data unit is located indicates that the fourth data frame carries evaluation feedback data, and/or the frame header of the fourth data frame carries the identifier of the corresponding evaluation data unit.

The frame header of the fourth data frame includes at least one of the following: the fourth evaluation parameter, the fifth evaluation parameter, or the timestamp when the evaluation data unit is received.

In an embodiment, the apparatus further includes an evaluation module.

The evaluation module is configured to, according to the delay evaluation parameter caused by the internal communication contention or control of the BSS, evaluate a delay performance involved in an internal communication environment of the BSS; and/or according to the delay evaluation parameter caused by the external interference of the BSS, evaluate a delay performance involved in the external interference of the BSS.

In an embodiment, the apparatus further includes a second acquisition module.

The second acquisition module is configured to, according to the delay evaluation parameter caused by the internal communication contention or control of the BSS and/or the delay evaluation parameter caused by the external interference of the BSS, acquire a delay performance evaluation result of whether a service to be transmitted is capable of accessing a current communication environment.

Optionally, multiple evaluation data units are provided; the delay evaluation parameter caused by the internal communication contention or control of the BSS includes the uplink internal delay evaluation parameter and the downlink internal delay evaluation parameter; and the delay evaluation parameter caused by the external interference of the BSS includes the uplink external delay evaluation parameter and the downlink external delay evaluation parameter.

The second acquisition module is configured to, in the case where a maximum value or an average value of a sum of the uplink internal delay evaluation parameter and the uplink external delay evaluation parameter corresponding to a same evaluation data unit among the multiple evaluation data units is greater than a maximum uplink delay index of the service to be transmitted, determine that the current communication environment does not satisfy the maximum uplink delay index of the service to be transmitted; and in the case where a maximum value or an average value of a sum of the downlink internal delay evaluation parameter and the downlink external delay evaluation parameter corresponding to a same evaluation data unit among the multiple evaluation data units is greater than a maximum downlink delay index of the service to be transmitted, determine that the current communication environment does not satisfy the maximum downlink delay index of the service to be transmitted.

In an embodiment, the sending module 91 is further configured to send an evaluation announcement for service access to the second communications node; or the receiving module 92 is further configured to receive an evaluation request for service access from the second communications node.

In an embodiment, the sending module 91 is further configured to send the delay performance evaluation result to the second communication node.

In an embodiment, the apparatus further includes an establishment module.

The establishment module is configured to establish an evaluation queue according to a contention parameter. The evaluation queue includes the evaluation data unit, and the contention parameter includes an access category, a maximum contention window, a minimum contention window, and an arbitration interframe space number.

The delay performance evaluation apparatus provided in this embodiment is configured to implement the delay performance evaluation method in the embodiments shown in FIGS. 1, 5, 6, 7, and 8. An implementation principle of the delay performance evaluation apparatus provided in this embodiment is similar, and details are not repeated here.

Figure 10:
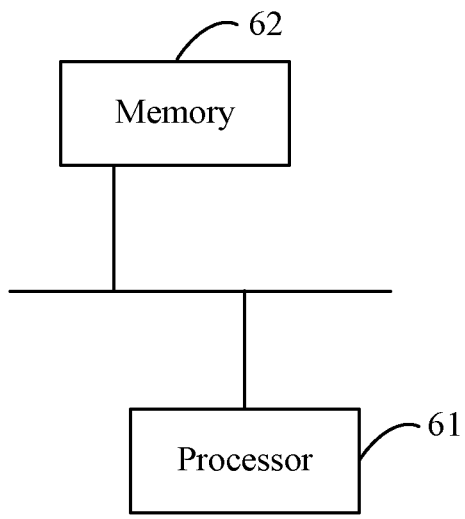
FIG. 10 is a structural diagram of a delay performance evaluation apparatus according to another embodiment.

FIG. 10 is a structural diagram of a delay performance evaluation apparatus according to another embodiment. As shown in FIG. 10, the delay performance evaluation apparatus includes a processor 61. Optionally, a memory 62 is further included. The delay performance evaluation apparatus may include one or more processors 61. One processor 61 is shown as an example in FIG. 10. The processor 61 and the memory 62 in the delay performance evaluation apparatus may be connected via a bus or in other manners. The connection via the bus is shown as an example in FIG. 10.

As a computer-readable storage medium, the memory 62 may be configured to store software programs, computer-executable programs, and modules, such as program instructions/modules corresponding to the delay performance evaluation method in the embodiment of FIG. 1 of the present application (for example, the sending module 91, the receiving module 92, and the first acquisition module 93 in the delay performance evaluation apparatus). The processor 61 executes various functional applications and data processing of the delay performance evaluation apparatus by running the software programs, instructions, and modules stored in the memory 62, that is, achieves the delay performance evaluation method in FIGS. 1, 5, 6, 7, and 8 and each optional embodiment.

The memory 62 may mainly include a program storage region and a data storage region. The program storage region may store an operating system and an application program required by at least one function. The data storage region may store data created according to the use of the delay performance evaluation apparatus. The memory 62 may include a high-speed random-access memory and may also include a non-volatile memory such as at least one disk memory, a flash memory device or another non-volatile solid-state memory.

The delay performance evaluation apparatus shown in FIG. 10 may be an access point or a station in a WLAN or may be set in an access point or a station.

An embodiment of the present application further provides a storage medium including a computer-executable instruction. When executed by a processor of a computer, the computer-executable instruction is used for causing the processor to perform the delay performance evaluation method according to any of the embodiments of the present application.

The preceding are only example embodiments of the present application and are not intended to limit the scope of the present application.

It is to be understood by those skilled in the art that the term "user terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

Embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable to the local technical environment, such as, but is not limited to, a general-purpose computer, a specialpurpose computer, a microprocessor, a digital signal processor (DSP), an application specific integrated circuit (ASIC), a field-programmable gate array (FPGA), and a processor based on a multi-core processor architecture.

What is claimed is:

1. A delay performance evaluation method, comprising:
sending, by a first communication node, an evaluation data unit to a second communication node;
receiving, by the first communication node, an evaluation feedback data unit which is sent by the second communication node and sent according to the evaluation data unit; and
according to the evaluation feedback data unit and a transmission condition of the evaluation data unit, acquiring, by the first communication node, at least one of the following:
a delay evaluation parameter caused by internal communication contention or control of a basic service set (BSS) where the first communication node is located; or
a delay evaluation parameter caused by an external interference of the BSS where the first communication node is located;
wherein the delay evaluation parameter caused by the internal communication contention or control of the BSS comprises at least one of:
a first evaluation parameter, wherein the first evaluation parameter is used for indicating a time period between a time point when the evaluation data unit enters a sending queue and a waiting start point for the evaluation data unit to be sent;
a second evaluation parameter, wherein the second evaluation parameter is used for indicating a waiting time period during which other communication nodes other than the first communication node in the BSS where the first communication node is located transmit data, and the waiting time period is within a time period between a time point when the evaluation data unit starts to be transmitted on a network and the waiting start point for the evaluation data unit to be sent; or
a fourth evaluation parameter, wherein the fourth evaluation parameter is used for indicating a time period between a time point when the evaluation data unit is initially received and the time point when the evaluation data unit starts to be transmitted on the network;
wherein the delay evaluation parameter caused by the external interference of the BSS comprises at least one of:
a third evaluation parameter, wherein the third evaluation parameter is used for indicating a waiting time period during which a communication node in an overlapping basic service set (OBSS) outside the BSS transmits data, wherein the waiting time period is within a time period between the time point when the evaluation data unit starts to be transmitted on the network and the waiting start point for the evaluation data unit to be sent; or
a fifth evaluation parameter, wherein the fifth evaluation parameter is used for indicating a time period between a time point when a retransmitted evaluation data unit is received and the time point when the evaluation data unit starts to be transmitted on the network in a case where initial transmission of the evaluation data unit fails.

2. The method of claim 1, wherein the evaluation data unit comprises at least one of the following:

the first evaluation parameter,
the second evaluation parameter,
the third evaluation parameter,
a plurality of timestamps before and when the evaluation data unit is sent, wherein the plurality of timestamps before and when the evaluation data unit is sent comprise a timestamp of the waiting start point for the evaluation data unit to be sent, a timestamp of the time point when the evaluation data unit enters the sending queue, a timestamp of a starting time point of evaluation data unit BSS internal waiting, a timestamp of an end time point of the evaluation data unit BSS internal waiting, a timestamp of a starting time point of evaluation data unit BSS external waiting, a timestamp of an end time point of the evaluation data unit BSS external waiting, and a timestamp of the time point when the evaluation data unit starts to be transmitted on the network; or
an identifier of the evaluation data unit.

3. The method of claim 2, wherein the evaluation feedback data unit comprises at least one of:
the fourth evaluation parameter,
the fifth evaluation parameter,
a timestamp when the evaluation data unit is received, wherein the timestamp when the evaluation data unit is received comprises a timestamp of the time point when the evaluation data unit is initially received or a timestamp of the time point when the retransmitted evaluation data unit is received; or
an identifier of the evaluation data unit corresponding to the evaluation feedback data unit.

4. The method of claim 3, wherein the evaluation feedback data unit further comprises at least one of the following:
the delay evaluation parameter caused by the internal communication contention or control of the BSS; or
the delay evaluation parameter caused by the external interference of the BSS.

5. The method of claim 3, wherein in a case where the evaluation data unit comprises at least one of the first evaluation parameter, the second evaluation parameter, the third evaluation parameter, or the identifier of the evaluation data unit and the evaluation feedback data unit comprises at least one of the fourth evaluation parameter, the fifth evaluation parameter, or the identifier of the evaluation data unit corresponding to the evaluation feedback data unit,
that the first communication node acquires at least one of the delay evaluation parameter caused by the internal communication contention or control of the BSS where the first communication node is located or the delay evaluation parameter caused by the external interference of the BSS where the first communication node is located comprises:
according to an evaluation parameter carried in the evaluation feedback data unit and an evaluation parameter carried in the evaluation data unit, determining, by the first communication node, at least one of the following:
the delay evaluation parameter caused by the internal communication contention or control of the BSS or the delay evaluation parameter caused by the external interference of the BSS.

6. The method of claim 3, wherein according to the transmission condition of the evaluation data unit and the evaluation feedback data unit, that the first communication node acquires at least one of the delay evaluation parameter caused by the internal communication contention or control of the BSS where the first communication node is located or the delay evaluation parameter caused by the external interference of the BSS where the first communication node is located comprises:
- according to at least one of the evaluation parameter carried in the evaluation feedback data unit or a time when the evaluation feedback data unit is received and at least one of the first evaluation parameter, the second evaluation parameter, or the third evaluation parameter that are locally stored, determining, by the first communication node, at least one of the following: the delay evaluation parameter caused by the internal communication contention or control of the BSS or the delay evaluation parameter caused by the external interference of the BSS.

7. The method of claim 2, wherein in a case where the evaluation data unit comprises the plurality of timestamps before and when the evaluation data unit is sent, that the first communication node acquires, according to the transmission condition of the evaluation data unit and the evaluation feedback data unit, at least one of the delay evaluation parameter caused by the internal communication contention or control of the BSS where the first communication node is located or the delay evaluation parameter caused by the external interference of the BSS where the first communication node is located comprises:
- according to at least one of a timestamp carried in the evaluation feedback data unit or a time when the evaluation feedback data unit is received and a timestamp carried in the evaluation data unit, determining, by the first communication node, at least one of the following:
- the delay evaluation parameter caused by the internal communication contention or control of the BSS; or
- the delay evaluation parameter caused by the external interference of the BSS.

8. The method of claim 2, wherein the evaluation data unit further comprises an independent evaluation data unit, wherein a frame header of a first data frame where the independent evaluation data unit is located satisfies at least one of the following:
- the frame header of the first data frame indicates that a type of the first data frame is an evaluation data unit type; or
- the frame header of the first data frame carries the identifier of the evaluation data unit.

9. The method of claim 8, wherein a frame body of the first data frame comprises at least one of the following:
- the first evaluation parameter,
- the second evaluation parameter,
- the third evaluation parameter, or
- the plurality of timestamps before and when the evaluation data unit is sent.

10. The method of claim 2, wherein the evaluation data unit further comprises a dependent evaluation data unit, wherein a frame header of a second data frame where the dependent evaluation data unit is located satisfies at least one of the following:
- the frame header of the second data frame indicates that the second data frame carries evaluation data; or
- the frame header of the second data frame carries the identifier of the evaluation data unit.

11. The method of claim 10, wherein the frame header of the second data frame further comprises at least one of the following:
- the first evaluation parameter,
- the second evaluation parameter,
- the third evaluation parameter, or
- the plurality of timestamps before and when the evaluation data unit is sent.

12. The method of claim 3, wherein the evaluation feedback data unit further comprises an independent evaluation feedback data unit and a frame header of a third data frame where the independent evaluation feedback data unit is located satisfies at least one of the following:
- the frame header of the third data frame indicates that a type of the third data frame is an evaluation feedback data unit type; or
- the frame header of the third data frame carries the identifier of the evaluation data unit corresponding to the evaluation feedback data unit.

13. The method of claim 12, wherein a frame body of the third data frame comprises at least one of the following:
- the fourth evaluation parameter,
- the fifth evaluation parameter, or
- the timestamp when the evaluation data unit is received.

14. The method of claim 3, wherein the evaluation feedback data unit further comprises a dependent evaluation feedback data unit, wherein a frame header of a fourth data frame where the dependent feedback evaluation data unit is located satisfies at least one of the following:
- the frame header of the fourth data frame indicates that the fourth data frame carries evaluation feedback data; or
- the frame header of the fourth data frame carries the identifier of the evaluation data unit corresponding to the evaluation feedback data unit.

15. The method of claim 14, wherein the frame header of the fourth data frame comprises at least one of the following:
- the fourth evaluation parameter,
- the fifth evaluation parameter, or
- the timestamp when the evaluation data unit is received.

16. The method of claim 1, wherein after the first communication node acquires, according to the transmission condition of the evaluation data unit and the evaluation feedback data unit, at least one of the delay evaluation parameter caused by the internal communication contention or control of the BSS where the first communication node is located or the delay evaluation parameter caused by the external interference of the BSS where the first communication node is located, the method further comprises at least one of the following:
- in a case where the first communication node acquires the delay evaluation parameter caused by the internal communication contention or control of the BSS, according to the delay evaluation parameter caused by the internal communication contention or control of the BSS, evaluating, by the first communication node, a delay performance involved in an internal communication environment of the BSS; or
- in a case where the first communication node acquires the delay evaluation parameter caused by the external interference of the BSS, according to the delay evaluation parameter caused by the external interference of the BSS, evaluating, by the first communication node, a delay performance involved in the external interference of the BSS.

17. A first communication node, comprising a processor; wherein the processor is configured to, when executing computer programs, perform:
- sending an evaluation data unit to a second communication node;
- receiving an evaluation feedback data unit which is sent by the second communication node and sent according to the evaluation data unit; and according to the evaluation feedback data unit and a transmission condition of the evaluation data unit, acquiring at least one of the following:
a delay evaluation parameter caused by internal communication contention or control of a basic service set (BSS) where the first communication node is located; or
a delay evaluation parameter caused by an external interference of the BSS where the first communication node is located;
wherein the delay evaluation parameter caused by the internal communication contention or control of the BSS comprises at least one of:
a first evaluation parameter, wherein the first evaluation parameter is used for indicating a time period between a time point when the evaluation data unit enters a sending queue and a waiting start point for the evaluation data unit to be sent;
a second evaluation parameter, wherein the second evaluation parameter is used for indicating a waiting time period during which other communication nodes other than the first communication node in the BSS where the first communication node is located transmit data, and the waiting time period is within a time period between a time point when the evaluation data unit starts to be transmitted on a network and the waiting start point for the evaluation data unit to be sent; or
a fourth evaluation parameter, wherein the fourth evaluation parameter is used for indicating a time period between a time point when the evaluation data unit is initially received and the time point when the evaluation data unit starts to be transmitted on the network;
wherein the delay evaluation parameter caused by the external interference of the BSS comprises at least one of:
a third evaluation parameter, wherein the third evaluation parameter is used for indicating a waiting time period during which a communication node in an overlapping basic service set (OBSS) outside the BSS transmits data, wherein the waiting time period is within a time period between the time point when the evaluation data unit starts to be transmitted on the network and the waiting start point for the evaluation data unit to be sent; or
a fifth evaluation parameter, wherein the fifth evaluation parameter is used for indicating a time period between a time point when a retransmitted evaluation data unit is received and the time point when the evaluation data unit starts to be transmitted on the network in a case where initial transmission of the evaluation data unit fails.

18. A non-transitory computer-readable storage medium, which is configured to store computer programs which, when executed by a processor in a first communication node, perform:

sending an evaluation data unit to a second communication node;
receiving an evaluation feedback data unit which is sent by the second communication node and sent according to the evaluation data unit; and
according to the evaluation feedback data unit and a transmission condition of the evaluation data unit, acquiring at least one of the following:
a delay evaluation parameter caused by internal communication contention or control of a basic service set (BSS) where the first communication node is located; or
a delay evaluation parameter caused by an external interference of the BSS where the first communication node is located;
wherein the delay evaluation parameter caused by the internal communication contention or control of the BSS comprises at least one of:
a first evaluation parameter, wherein the first evaluation parameter is used for indicating a time period between a time point when the evaluation data unit enters a sending queue and a waiting start point for the evaluation data unit to be sent;
a second evaluation parameter, wherein the second evaluation parameter is used for indicating a waiting time period during which other communication nodes other than the first communication node in the BSS where the first communication node is located transmit data, and the waiting time period is within a time period between a time point when the evaluation data unit starts to be transmitted on a network and the waiting start point for the evaluation data unit to be sent; or
a fourth evaluation parameter, wherein the fourth evaluation parameter is used for indicating a time period between a time point when the evaluation data unit is initially received and the time point when the evaluation data unit starts to be transmitted on the network;
wherein the delay evaluation parameter caused by the external interference of the BSS comprises at least one of:
a third evaluation parameter, wherein the third evaluation parameter is used for indicating a waiting time period during which a communication node in an overlapping basic service set (OBSS) outside the BSS transmits data, wherein the waiting time period is within a time period between the time point when the evaluation data unit starts to be transmitted on the network and the waiting start point for the evaluation data unit to be sent; or
a fifth evaluation parameter, wherein the fifth evaluation parameter is used for indicating a time period between a time point when a retransmitted evaluation data unit is received and the time point when the evaluation data unit starts to be transmitted on the network in a case where initial transmission of the evaluation data unit fails.

* * * * *